Figure 1:
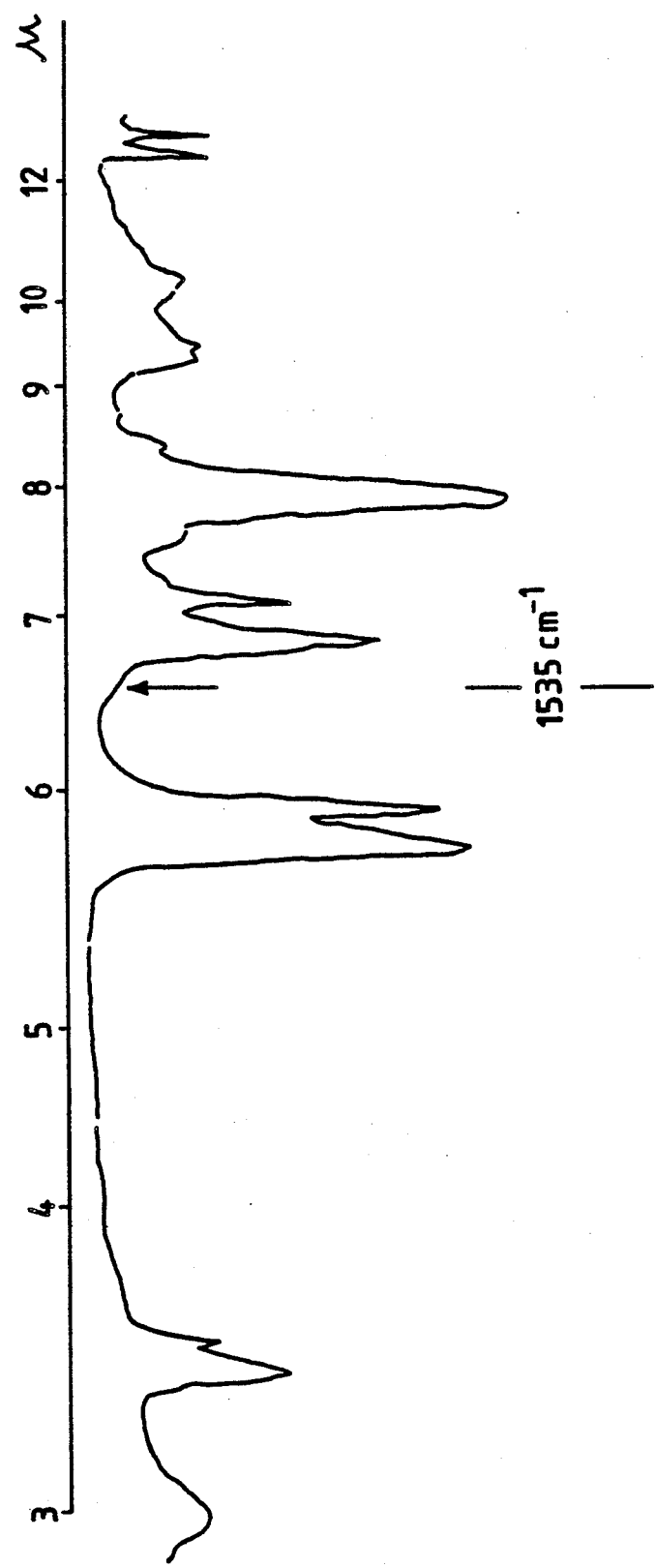

United States Patent [19]

Greco et al.

[11] Patent Number: 4,990,578

[45] Date of Patent: Feb. 5, 1991

[54] POLYOL-POLYCARBONATES AND PROCESS FOR PREPARING THEM

[75] Inventors: Alberto Greco; Gabriele Lugli, both of Milan, Italy

[73] Assignee: Enichem Synthesis S.p.A., Palermo, Italy

[21] Appl. No.: 367,557

[22] Filed: Jun. 19, 1989

[30] Foreign Application Priority Data

Jun. 23, 1988 [IT] Italy ................................ 21080 Z/88

[51] Int. Cl.$^5$ ............................................. C08L 75/00
[52] U.S. Cl. ..................... 523/456; 524/101; 528/73; 528/367; 544/221
[58] Field of Search ..................... 523/456; 524/101; 528/73, 367; 544/221

[56] References Cited

U.S. PATENT DOCUMENTS 4,262,119  4/1981  Milnes ................................ 544/221

Primary Examiner—Maurice J. Welsh

[57] ABSTRACT

Polyol-polycarbonates having a molecular weight comprising within the range from 750 to 2500, endowed with good rheologic characteristics and having a low glass transition temperature (Tg), are obtained by means of the reaction, under transesterification conditions, of
(a) an organic carbonate;
(b) a saturated alifatic $\alpha,\omega$-glycol; and
(c) tris-(hydroxyethyl)-isocyanurate.

These polyol-polycarbonates are useful as bases for paints in combination with polyisocyanates.

Furthermore, the polyol-polycarbonates can be reacted with bicarboxy acids, or with cyclic anhydrides in order to yield the corresponding products with carboxy end groups which are useful as bases for paints in combination with melaminic or epoxy resins.

9 Claims, 4 Drawing Sheets

POLYOL-POLYCARBONATES AND PROCESS FOR PREPARING THEM

The present invention relates to polyolpolycarbonates, to the process for preparing them and to their use in the sector of paints.

In the art polyol-polycarbonates are known, which can be obtained by means of the transesterification of an alifatic glycol with an organic carbonate, by generally operating in the presence of a catalyst, as disclosed in U.S. Pat. Nos 2,843,567; 2,789,964; 3,000,849 and U.S. Pat. No. 3,544,524. The diol-polycarbonates can also be obtained by means of the condensation of alifatic glycols with phosgene, by operating in the presence of an acid acceptor, as disclosed in U.S. Pat. No. 4,533,729. Finally, U.S. Pat. No. 3,506,623 discloses diol-polycarbonates obtained by starting from a cycloalifatic glycol.

The diol-polycarbonates obtained by starting from alifatic glycols are products having chain-end hydroxy functionality and a molecular weight generally comprised within the rane of from 500 to 5,000, which are used in the preparation of polyurethanic thermoelastomers, as substitutes of the traditional polyesters. The use of the diol-polycarbonates makes it possible in fact polyurethanes to be obtained, which are endowed with a higher resistance to ageing, to mineral oils and to abrasion, and generally displaying improved mechanical characteristics, as disclosed by Hamb and Gorman in "Polyurethane, New Paths Prog. Mark. Technolog. Proc. SPI Inte.; Tech. Mark. Conf., 6th, pages 464–8 (1983). Furthermore, the diol-polycarbonates obtained from cycloalifatic glycols, in particular from cyclohexanedimethanol, produce polyurethanes endowed with improved characteristics as regard their ultimate tensile strength.

The present invention relates to novel polyol-polycarbonates having a hydroxy functionality higher than 2, which are useful as bases for painting products with improved characteristics of adhesion to steel, and of low discoloration (yellowing).

In accordance therewith, the present invention relates to a polyol-polycarbonate having a hydroxy functionality higher than 2, a molecular weight comprised within the range of from 750 to 2500 and a glass transition temperature ($T_g$) equal to, or lower than, $-30°$ C., which are obtained by means of the reaction, under transesterification conditions, of (a) an organic carbonate;
(b) a saturated alifatic $\alpha,\omega$-glycol containing from 4 to 12 carbon atoms in their molecule; and
(c) tris-(hydroxyethyl)-isocyanurate, by operating with a ratio of the hydroxy groups contained in the (b) and (c) reactants, to the carbonate ester groups contained in the (a) reactant, which is comprised within the range of from 1.1:1 to 2:1, and with a molar ratio of the (b) reactant to the (c) reactant, which is comprised within the range of from 2:1 to 10:1.

The organic carbonates which are used for the transesterification reaction are advantageously selected from among dialkyl carbonates (preferably dimethyl carbonate), dialkylene carbonates (preferably diallyl carbonate), cycloalkylene carbonates and diaryl carbonates (preferably diphenyl carbonate).

The saturated aliphatic glycol preferably used in the reaction of transesterification is 1,6-hexanediol.

In the preferred form of practical embodiment, the process is carried out by operating with a ratio of the hydroxy groups contained in the (b) and (c) reactants, to the carbonate ester groups contained in the (a) reactant, which is comprised within the range of values of from 1.2:1 to 1.5:1, and with a molar ratio of the (b) reactant to the (c) reactant comprised within the range of from 2:1 to 5:1. In the most preferred form of practical embodiment of the invention, the molar ratio of the (b) reactant to the (c) reactant is equal to, or is of the order of, 3:1.

The reaction of transesterification can be carried out at a temperature comprised within thee range of from about 100° C. up to about 220° C., with the alcohol or the phenol formed as a reaction byproduct being removed. In order to carry out such a removal, the process should be carried out under a reduced pressure (for example, under a pressure comprised within the range of from 0.5 to 80 torr), at least during the last part of the reaction.

When the (a) component is a diaryl carbonate, the reaction of transesterification takes place in the absence of catalysts. With the other organic carbonates, the reaction is carried out in the presence of a catalyst, such as an alkali metal alkoxide, e.g., sodium methoxide.

By operating with the above reported ratios between the reactants and under the above reported reaction conditions, the polyol-polycarbonates according to the present invention are obtained, which are liquid under room conditions, or are low-melting solids, and which are endowed with the following general characteristics:

molecular weight comprised within the range of from 750 to 2500, and preferably of from 800 to 1500 (determination by means of "vapor phase osmometry");

hydroxy functionality comprised within the range of from 2.2 to 4, and preferably of from 2.5 to 3.5 (for the above reported molecular weights, such values of hydroxy functionality correspond to a content of hydroxy groups comprised within the range of from about 2.5 up to about 9% and, in the preferred form of practical embodiment, of from about 3 to about 6% by weight);

glass transition temperature ($T_g$) comprised within the range of from $-30°$ C. up to $-50°$ C.

The structural analysis of the polyol-polycarbonates according to the present invention showed that groups deriving from oxazolidinone

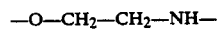

are present in the chain; such groups are formed owing to the occurrence of phenomena of degradation of tris(-hydroxyethyl)-isocyanurate.

The present Applicant found that this structure is favoured by the presence of the transesterification catalyst, by high temperatures and by long reaction times. In any case, when the process is carried out within the range of conditions as hereinabove pointed out, polyol-polycarbonates are obtained, which contain an amount of units derived from oxazolidinone, which may be comprised within the range of from about 0.1 up to 6% by weight. The presence of these units is thought to favour the characteristics of adhesion to steel of the paints which make use of the polyol-polycarbonates according to the present invention.

Such polyol-polycarbonates display good rheologic characteristics, are soluble in the normal organic solvents (such as, e.g., xylene), and are useful as bases for painting products in combination with isocyanates, also useable in polymeric form, as isocianurates or derivatives of biuret. Isocyanates useful for the intended purpose are aliphatic or aromatic diisocyanates, such as hexamethylene-diisocyanate, isophoronediisocyanate, toluene-diisocyanate, diphenylmethanediisocyanate, the trimer of hexamethylene-diisocyanate and the commercial products DESMODUR N and DESMODUR N 3300 by Bayer.

The polyol-polycarbonates according to the present invention can be reacted with bicarboxy acids or with cyclic anhydrides in order to yield the corresponding products with end carboxy groups.

The reaction between the polyol-polycarbonates and the bicarboxy acid anhydrides takes easily place in bulk, even in the absence of catalysts, at temperatures of the order of from 120° to 180° C., such as disclosed, e.g., in DE-2,254,487. Useful anhydrides for the intended purpose are of aliphatic or aromatic type, such as, e.g., phthalic anhydride, pyromellitic anhydride, trimellitic anhydride, tetrahydrophthalic anhydride, succinic anhydride and itaconic anhydride. In the reaction a ratio of 1:1 of the mols of anhydride to the number of hydroxy groups in the polyol-polycarbonate is mantainined.

According to an alternative route, the polyol-polycarbonate is reacted with a bicarboxy acid, such as, e.g., phthalic acid, isophthalic acid, terephtalic acid, succinic acid or adipic acid, by operating at temperatures comprised within the range of from 180° C. up to 250° C., in the presence of a catalyst, such as dibutyltin oxide. Also in this case, a ratio of 1:1 is maintained between the mols of bicarboxy acid and the number of the hydroxy groups of the polyol-polycarbonate.

The so obtained products with chain-end carboxy groups are still endowed with good rheologic characteristics, are soluble in the normal organic solvents, such as, e.g., xylene, and are useful as bases for painting products in combination with melamine resins, in particular with partially or totally alkoxylated melamine resins and with the epoxy resins, such as, e.g., the bisglycidyl derivatives of bisphenol-A and the epoxidated novolac resins.

In any case, these paints display good characteristics of adhesion, in particular to steel, of hardness (abrasion resistance), of gloss and of resistance to chemical and physical agents. A further desirable characteristic of such paints consists in their low trend to undergo discoloration (yellowing).

The following experimental examples are reported for the purpose of better illustrating the present invention.

EXAMPLES 1-3

Three tests of copolymerization are carried out by using 1,6-hexanediol, tris-(hydroxyethyl)-isocyanurate (TEIK) and diallyl carbonate (DAC) as the transesterification agent.

The catalyst is sodium methoxide (Na-Met).

All of the reaction parameters are maintained constant, except for temperature, which is maintained at three different values during the last reaction step, and precisely, respectively at the values of 100° C., 120° C. and 140° C.

The amount of the reactants charged to the reaction is the following:

| | | |
|---|---|---|
| hexanediol | 590.9 g | (5.0 mol) |
| TEIK | 417.6 g | (1.6 mol) |
| DAC | 751.8 g | (5.29 mol) |
| Na-Met | 0.45 g | (0.0083 mol) |

The transesterification is carried out inside a kettle equipped with a rectification column, a water-cooled head and a device for control sample drawing and for refluxing.

The reaction is carried out for three hours under a reduced pressure of 80 torr, and for 90 minutes under the maximum vacuum of 0.5 torr.

During the first three hours, the temperature is maintained at 90°-100° C. and during the highest vacuum step is adjusted at the value of 100° C.±2° C. (Example 1), of 120° C.±2° C. (Example 2), and of 140° C.±2° C. (Example 3).

The distillation product in the three tests is constituted by allyl alcohol (assay $\geq$99%), contaminated by a small amount of DAC (maximum 1%). Said amount of developed allyl alcohol constitutes 99.5±0.5% of the theoretical alcohol amount which can be developed during the transesterification (10.52 mol).

The residue inside the kettle is constituted by hexanediol and TEIK polycarbonate, containing in its macromolecule units deriving from oxazolidinone $$-O-CH_2-CH_2-NH-.$$

These latter units are deduced from the difference between the theoretical aumount of hydroxy groups expected for the polycarbonate (i.e., in the absence of the reaction leading to the formation of oxazolidinone units) and the amount of actually found hydroxy groups, with a correction being introduced in order to make due allowance for the chain end groups of different type, i.e., the allyl-carboxy groups.

The characteristics of these polycarbonates are reported in Table 1.

FIG. 1 reports the I.R. spectra of the polycarbonates obtained in Examples 1 and 3. These spectra show that with increasing reaction temperature, the bands of the carbonyl groups of TEIK ring at 1695 cm$^{-1}$ decrease, and the bands at 1535 cm$^{-1}$, due to the NH group contained in $$-O-CH_2-CH_2-NH-$$

structure, increase.

In the $^1$H-N.M.R. spectrum, the

proton contained in the same structure generates a peak at 6.1 δ.

Figure 3:
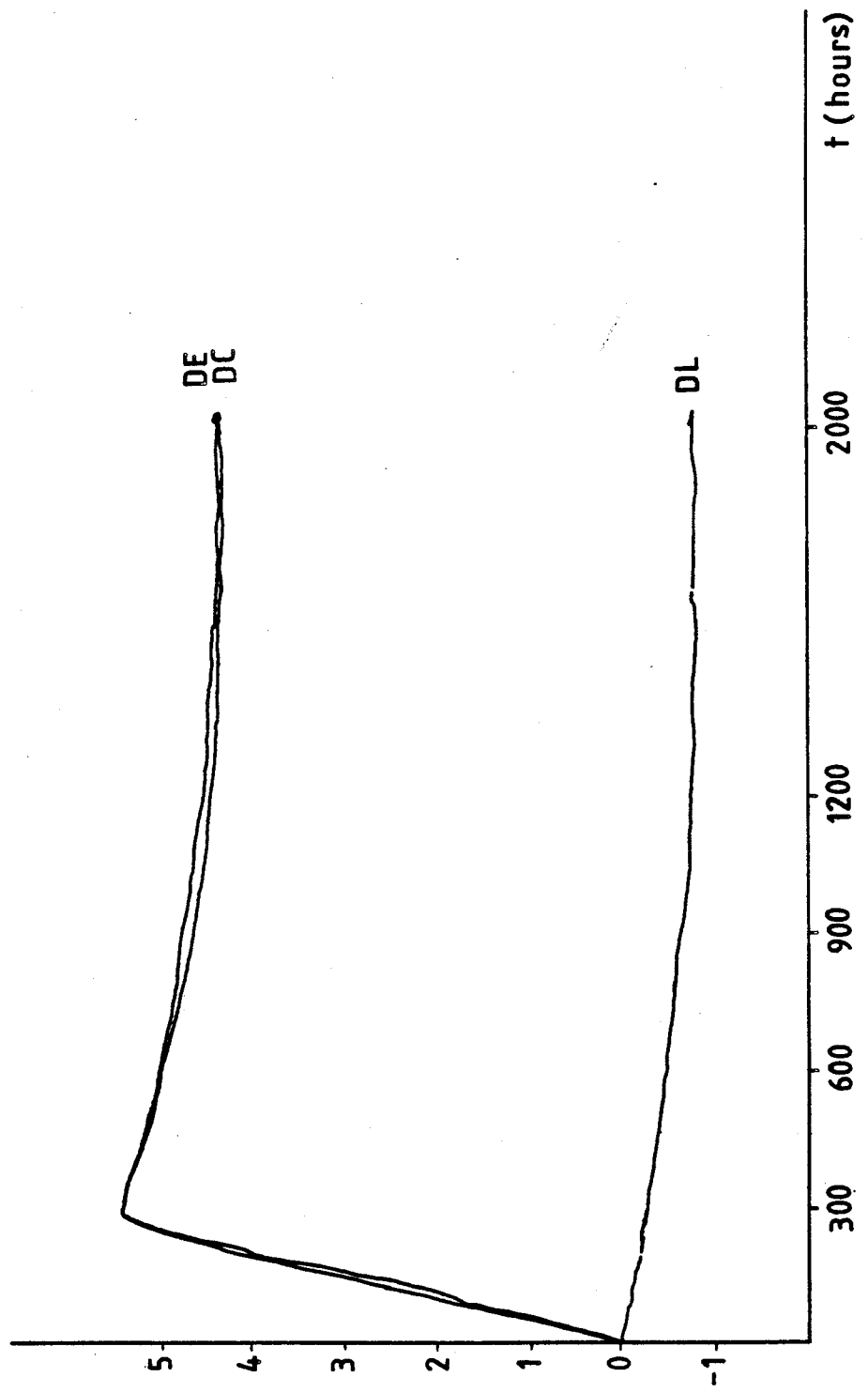

In FIGS. 1 and 3, the spectrum relevant to the polycarbonate obtained in Example 1 (reaction temperature 100° C.) and the spectrum relevant to the polycarbonate obtained in Example 3 (reaction temperature 140° C.) are reported.

EXAMPLES 4-6

The process is carried out in the same way as of Example 1, three tests of copolymerization are carried out using 1,6-hexanediol, TEIK and diphenyl carbonate (DFC) in the following molar proportions:

| Example No. | | 4 | 5 | 6 |
|---|---|---|---|---|
| Hexanediol | (mol) | 5 | 5 | 5 |
| TEIK | (mol) | 1.6 | 1.6 | 1.6 |
| DFC | (mol) | 6 | 5.48 | 5.29 |

The tests are carried out at the constant temperature of 210° C. for the first three hours (room pressure) and of 190° C. during the following 105 minutes (pressure 5 torr). During the reaction phenol is recovered in a total amount of 98±0.5% of the theoretical value.

In Example 4 an amount of 1,162 g, in Example 5 an amount of 1,121 g and in Example 6 an amount of 1,117 g of hexanediol-TEIK-polycarbonate are obtained.

The characteristics of these polycarbonates are reported in Table 2.

EXAMPLE 7

The polycarbonate obtained in Example 6 (600 g; total OH meq 1,178.4), tetrahydrophthalic anhydride (179.4 g; total meq 1,178.4) and dimethylamino-pyridine (0.3% by weight) are stirred for 5 hours at 160° C. under nitrogen. At the end of this time, the number of acidity of the product was of 84 mg of KOH/g (theoretical value 84.7 mg of KOH/g).

This product is diluted in xylene down to a content of 60% of solids, yielding a clear solution of light yellow colour having a viscosity of 380 cps at 25° C.

EXAMPLES 8–10

Three formulations are prepared, which contain the following components, in parts by weight:

| | |
|---|---|
| universal white paste | 38 |
| polymeric base | 40 |
| melamine resin M170 | 15 |
| isobutyl alcohol | 1 |
| acetyl cellosolve | 1 |
| Solvesso 100 | 2 |
| xylene | 1 |
| TEGO-glide 410 solution (*) | 1 |
| ASCININ P (*) | 0.5 |
| BYK 065 (*) | 0.5 |

(*) Additives for paints, suitable for favouring the spreadability of the same paints.

The universal white paste is constituted by titanium dioxide (65 parts by weight), suspending agent (2 parts by weight) and ALFALAT 502 resin (25 parts by weight). This latter is a commercial alkydic soy resin at 60% of xylene, with 50% of triglyceride and 37% of phthalic anhydride; it has a number of acidity of 10 mg of KOH/g, and a hydroxy number of 10 meq/g.

The polymeric base used in Examples 8, 9 and 10 is the following:

Example 8 (comparative example): ALFALAT 9910 resin; a commercial short-oil alkydic resin from vegetable fats, at 60% of xylene, with a number of acidity lower than 12 mg of KOH/g, and hydroxy number of about 3 meq/g;

Example 9 (comparative example): aliphatic polycarbonate having a number average molecular weight of about 1,000, modified with tetrahydrophthalic anhydride;

Example 10: modified polycarbonate obtained in Example 5.

The three formulations are spread in the form of a film of 60 μ of thickness on anhydrous steel. The three formulations are dried by means of the following modalities:

10 minutes at room temperature;
10 minutes at 60° C.
10 minutes at 80° C.
20 minutes at 120° C.
10 minutes at 140° C.

On the dried paints the characteristics are determined, which are reported in Table 3.

Figure 2:
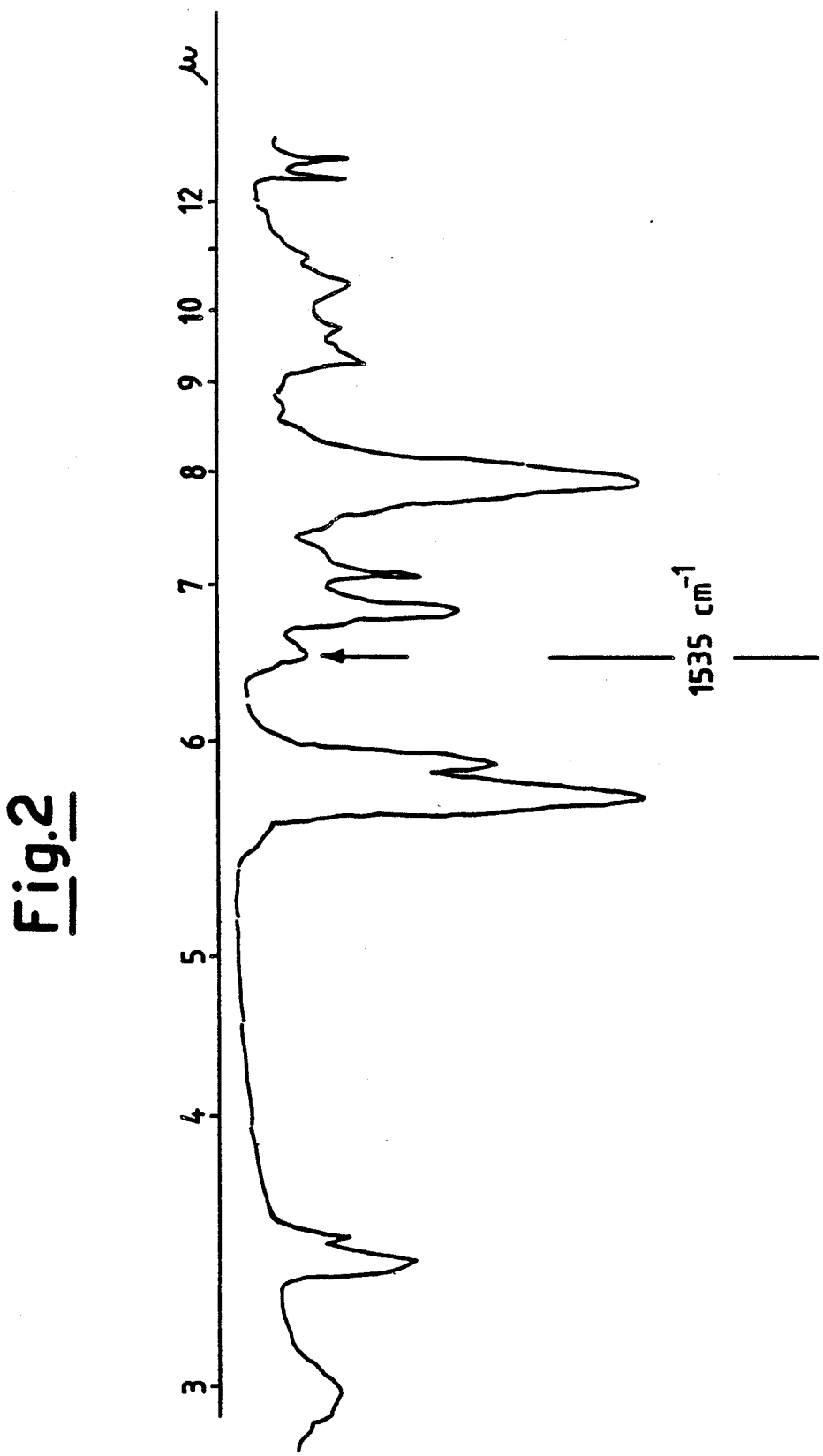

The dried paints of Examples 8 and 10 are submitted to irradiation in W-O-M (full-light cycle, 53° C.). After 200 hours of irradiation, the measurements of values of paint brightness are started, and are continued up to 2,000 hours of irradiation. For this purpose, the Macbeth Color Eye spectrophotometer is used. The results are reported in FIG. 2 (Example 8) and in FIG. 3 (Example 10) of the hereto attached drawing tables.

Figure 4:
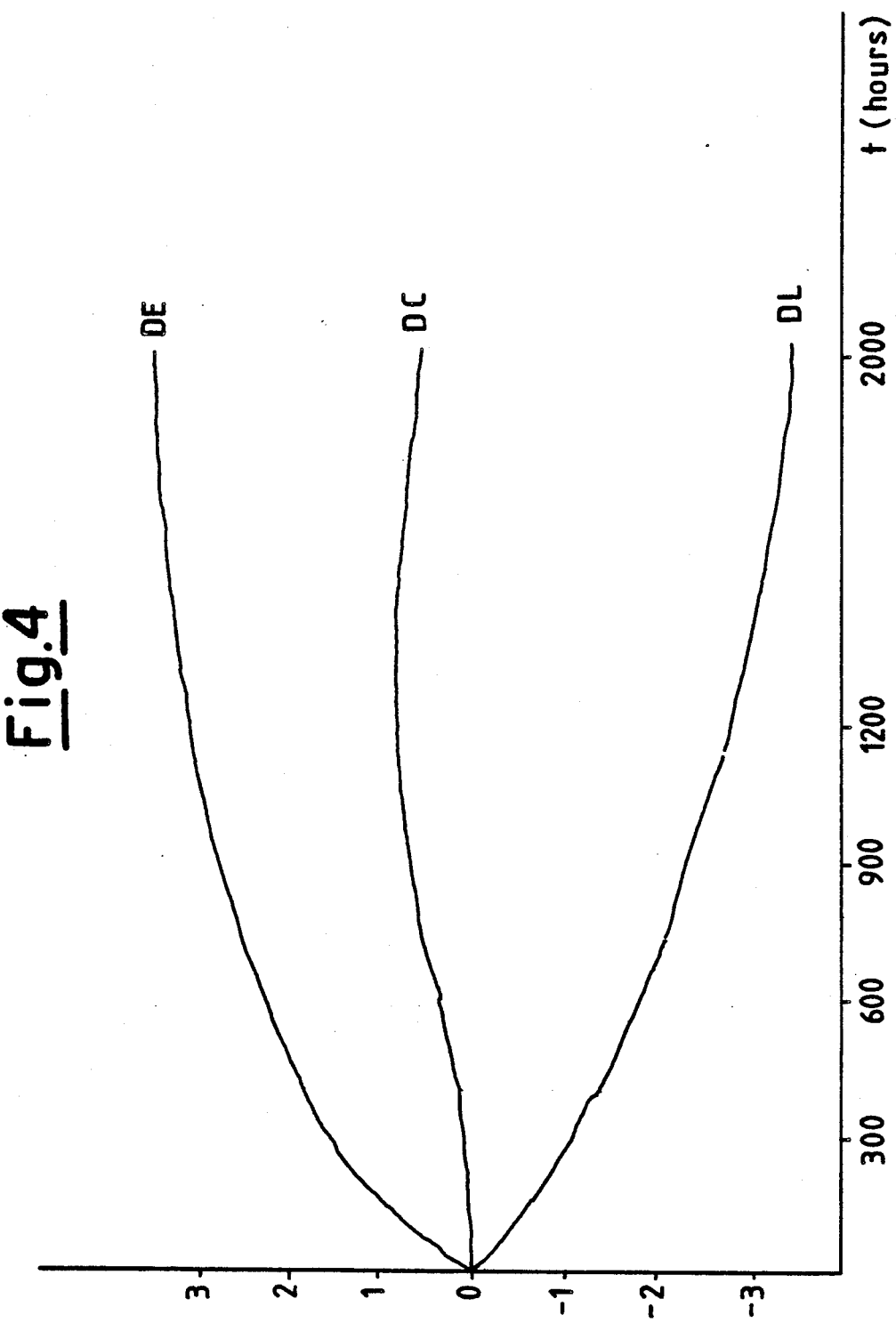

By comparing said two figures, one can observe that whilst in both of said paints a change in brightness occurs, which tends to stabilize with time, the paint of Example 10 shows, differently from the paint of Example 8, a constancy in chromatic component. In FIGS. 3 and 4 L means the brightness, and $\underline{a}$ and $\underline{b}$ stand for the chromatic components.

Furthermore $$\Delta C = \geq \Delta a^2 + \Delta b^2$$

$$\Delta E = \geq \Delta L^2 + \Delta a^2 + \Delta b^2$$

wherein:

ΔC is the change in chromatic components;
ΔE is the change in colour, in its main components, including the brightness values.

TABLE 1

CHARACTERISTICS OF POLYCARBONATE

| Example No. | Found OH (meq/g) | Theoretical OH (meq/g) | Double bonds (meq/g) | —OCH$_2$CH$_2$—NH— Units (meq/g) | T$_g$ (°C.) | Melting point (°C.) | Viscosity, Pa.s | | | Molecular weight | |
|---|---|---|---|---|---|---|---|---|---|---|---|
| | | | | | | | 25° C. | 50° C. | 75° C. | VPO | computed |
| 1 | 3.153 | 3.706 | 0.21 | 0.343 | −41 | Liq. | 47.7 | 6.9 | 1.1 | — | 810 |
| 2 | 2.023 | 3.706 | 0.096 | 1.587 | −47.1 | Liq. | 164 | 12.0 | 1.3 | 1250 | 1416 |
| 3 | 1.829 | 3.706 | 0.21 | 1.667 | −42.7 | 64 | — | 1.8 | 0.179 | — | 1470 |

TABLE 2

CHARACTERISTICS OF POLYCARBONATE

| Ex. No. | Found OH (meq/g) | Theoretical OH (meq/g) | $-C(=O)-O-C_6H_5$ end groups (meq/g) | $-OCH_2CH_2-NH-$ Units (meq/g) | $T_g$ (°C.) | Melting point (°C.) | Viscosity, Pa.s 25° C. | 50° C. | 75° C. | Molecular weight VPO | computed |
|---|---|---|---|---|---|---|---|---|---|---|---|
| 4 | 1.888 | 2.406 | 0.41 | 0.108 | −30 | Liq. | 412 | 102 | 14.4 | — | 1256 |
| 5 | 2.071 | 3.429 | 0.6 | 1.198 | −34.9 | Liq. | 237 | 25 | 3.9 | 790 | 875 |
| 6 | 1.964 | 3.776 | 0.3 | 1.512 | −40 | Liq. | 168 | 10 | 1.9 | — | 794 |

TABLE 3

| Paint Example | 8 | 9 | 10 |
|---|---|---|---|
| Appearance | good | good | good |
| Drying time | standard | standard | standard |
| Adhesion | 100% | zero | 100% |
| Hardness | 4 H | zero | 3–4 H |
| Impact strength | >31 cm | 3–5 cm | >31 cm |

The methods used for the evaluations are:

| | |
|---|---|
| Adhesion | Crosshatching and adhesive tape (DIN 53151) |
| Hardness | Pencil method (ASTM D-3363) |
| Reverse Impact Strength with | Gardner Impact Tester (ASTM D-2794) |

We claim:

1. Polyol-polycarbonate having a hydroxy functionality comprised within the range of from 2.2 to 4, a molecular weight comprised within the range of from 750 to 2500 and a glass transition temperature (Tg) equal to, or lower than, −30° C., obtained by means of the reaction, under transesterification conditions, of
   (a) an organic carbonate;
   (b) a saturated aliphatic α,ω-glycol containing from 4 to 12 carbon atoms in its molecule; and
   (c) tris-(hydroxyethyl)-isocyanurate,
by operating with a ratio of the hydroxy groups contained in the (b) and (c) reactants, to the carbonate ester groups contained in the (a) reactant, which is comprised within the range of from 1.1:1 to 2:1, and with a molar ratio of the (b) reactant to the (c) reactant, which is comprised within the range of from 2:1 to 10:1.

2. Polyol-polycarbonate according to claim 1, characterized in that said organic carbonate is a dialkyl carbonate, a dialkylene carbonate, a cycloalkylene carbonate or a diaryl carbonate.

3. Polyol-polycarbonate according to claim 2, characterized in that said organic carbonate is selected from the group consisting of dimethyl carbonate, diallyl carbonate, and diphenyl carbonate.

4. Polyol-polycarbonate according to claim 1, characterized in that said saturated aliphatic α,ω-glycol is 1,6-hexanediol.

5. Polyol-polycarbonate according to claim 1, characterized in that the process is carried out by operating under transesterification conditions with a ratio of the hydroxy groups contained in the (b) and (c) reactants, to the carbonate ester groups contained in the (a) reactant, which is comprised within the range of from 1.2:1 to 1.5:1, and with a molar ratio of the (b) reactant to the (c) reactant, which is comprised within the range of from 2:1 to 5:1.

6. Polyol-polycarbonate according to claim 1, characterized in that said transesterification is carried out at a temperature comprised within the range of from about 100° C. up to about 220° C., with the alcohol or the phenol formed as a reaction byproduct being removed.

7. Polyol-polycarbonate according to claim 1, having a molecular weight comprised within the range of from 800 to 1500, a hydroxilic functionality from 2,5 to 3,5 and a glass transition temperature (Tg) comprised within the range of from −30° C. to −50° C.

8. Polyol-polycarbonate with end-chain carboxy groups, obtained by means of the reaction of the polyol-polyester according to any one of claims 1 to 7 with an equivalent amount of a bicarboxy acid or of a cyclic anhydride.

9. Polyol-polycarbonate with chain-end carboxy groups according to claim 8, characterized in that the cyclic anhydride is selected from among phthalic anhydride, pyromellitic anhydride, trimellitic anhydride, tetrahydrophthalic anhydride, succinic anhydride and itaconic anhydride, and the bicarboxy acid is selected from among phthalic acid, isophthalic acid, terephtalic acid, succinic acid and adipic acid.

* * * * *